March 20, 1945.  B. M. HYMAN  2,371,822
TRACTOR-MOUNTED HARVESTER
Filed Nov. 14, 1942  3 Sheets-Sheet 1
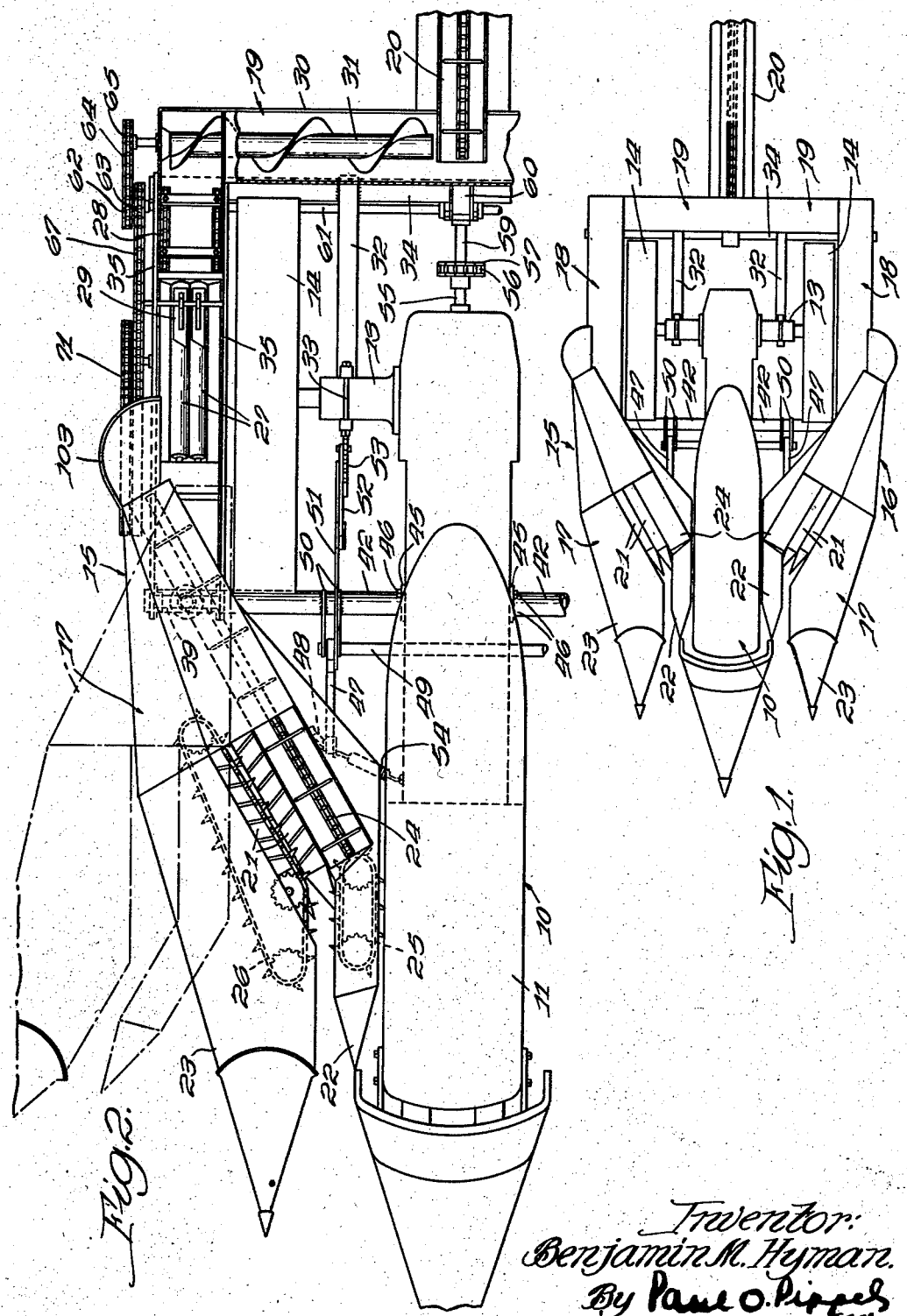
Inventor:
Benjamin M. Hyman.
By Paul O. Pippel
Atty.

March 20, 1945.  B. M. HYMAN  2,371,822
TRACTOR-MOUNTED HARVESTER
Filed Nov. 14, 1942  3 Sheets-Sheet 2
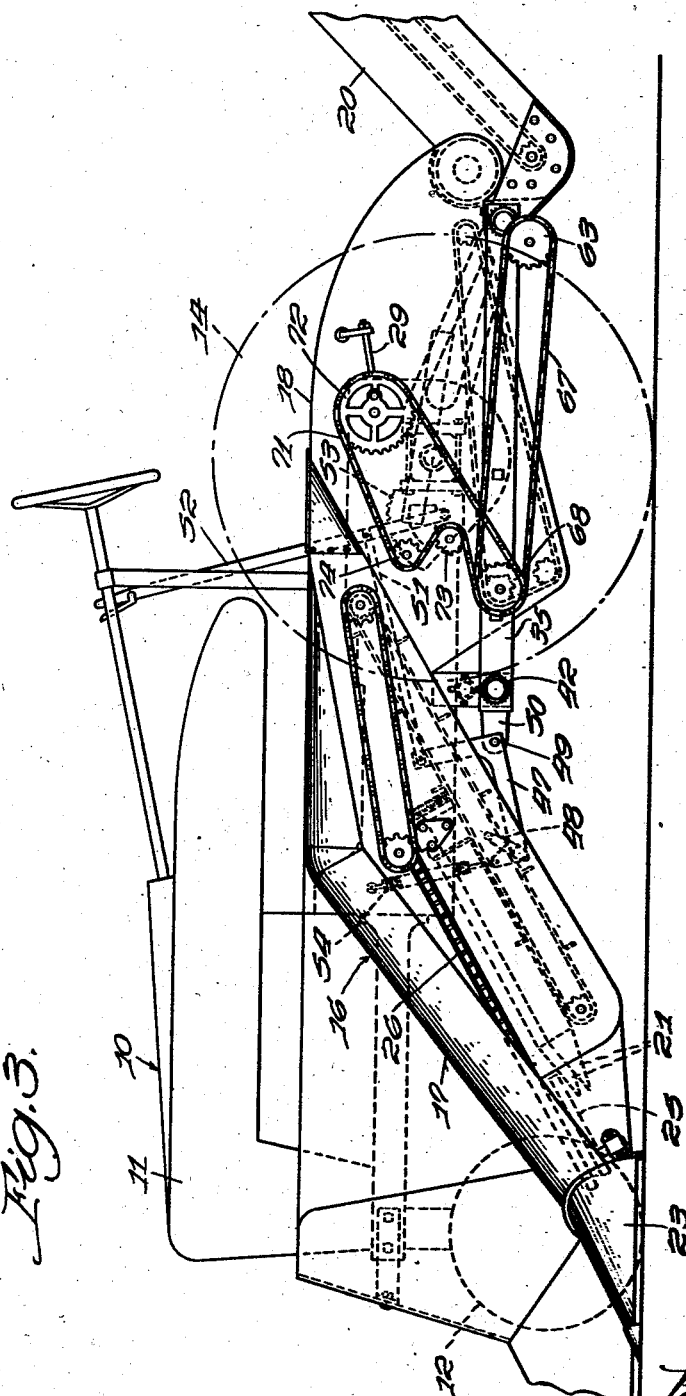

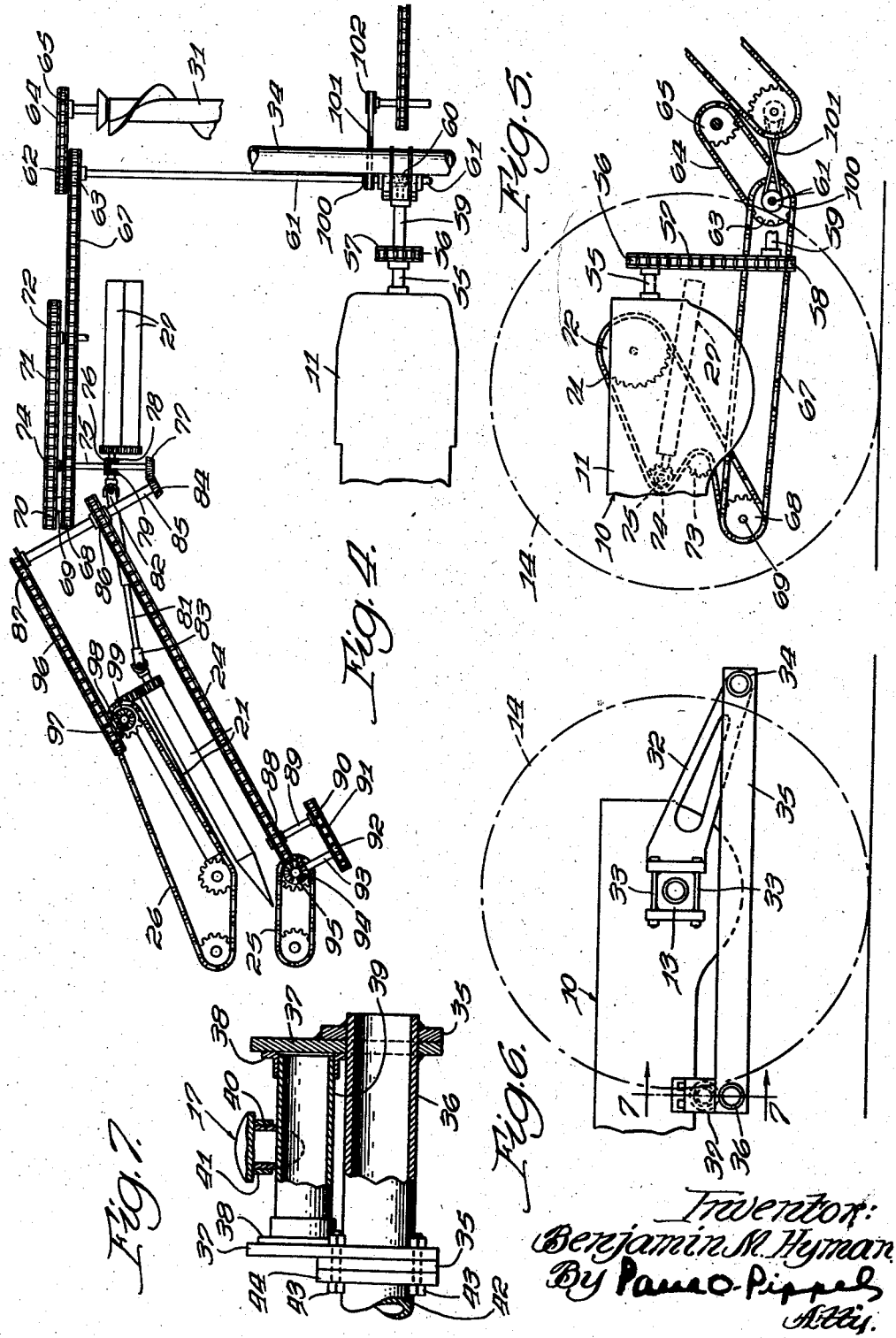

Patented Mar. 20, 1945

2,371,822

UNITED STATES PATENT OFFICE 2,371,822

TRACTOR-MOUNTED HARVESTER

Benjamin M. Hyman, Moline, Ill., assignor to International Harvester Company, a corporation of New Jersey Application November 14, 1942, Serial No. 465,562

13 Claims. (Cl. 56—18)

This invention relates to a tractor-mounted harvester. More specifically, it relates to a tractor-mounted corn picker.

It is generally desirable to mount a corn picker upon a tricycle type tractor so that the snapping units are immediately adjacent the front of the body, so as to snap ears from adjacent rows. The rear wheels of the tractor are spaced from the body, and thus the husking units extend across the rear axle between the wheels and the body. The disadvantage with this arrangement is that the positioning of the husking units over the rear axle of a tractor makes it difficult to remove the corn picker from the tractor. This difficulty is, of course, avoided if the picking units are positioned so that they extend entirely outwardly of the tractor wheels, but then the units are so widely spaced that they cannot pick along adjacent rows.

An object of the present invention is to provide an improved harvester.

A further object is the provision of an improved tractor-mounted harvester.

Another object is to provide an improved tractor-mounted corn picker.

Still another object is the provision of an improved mounting of a corn picker upon a tractor, whereby removal of the picker from the tractor is facilitated.

Other objects will appear from the disclosure.

According to the present invention, a corn picker is so mounted upon a tractor that snapping units snap corn at points immediately adjacent the body of the tractor and convey the snapped corn to husking units which extend along the tractor to the rear thereof outside of the rear wheels of the tractor. With this arrangement, ears are gathered from adjacent rows of corn and yet there is no structure of the corn picker extending across the rear axle of the tractor which would make difficult the attachment to and detachment from the tractor.

In the drawings,

Figure 1 is a plan view of the corn picker of the present invention mounted upon a tractor;

Figure 2 is an enlarged plan view of the right half of the corn picker mounted upon the tractor;

Figure 3 is a side view of the left half of the corn picker mounted upon a tractor;

Figure 4 is a schematic plan view of the drive for the right half of the corn picker;

Figure 5 is a schematic side view of the drive;

Figure 6 is a side view, with parts omitted, showing the supporting framework for the left side of the corn picker; and Figure 7 is a sectional view taken along the line 7—7 of Figure 6.

The reference character 10 designates a tractor which includes a narrow body 11, a narrow front rolling support 12, a rear axle 13, and rear wheels 14. Figure 1 shows the corn picker of the present invention in its entirety. It comprises a right-hand unit 15 and a symmetrical and identical left-hand unit 16. Each unit is composed of a snapping unit 17, a husking unit 18, and a transverse feeding device 19 to the rear of the tractor. Extending rearwardly from a point between the two transverse feeding devices 19 is a wagon elevator 20. Each snapping unit 17 comprises a pair of snapping rolls 21, a small gather point 22 immediately adjacent the tractor body 11, a large gather point 23 spaced from the body 11, and an ear elevator 24 extending from the inner side of the snapping rolls outwardly to a point outside the one tractor wheel 14. The snapping unit also includes an inner gathering chain 25, positioned in the inner gather point 22, and an outer gather chain 26 positioned in the outer gather point 23. Each husking unit 18 includes husking rolls 27, a conveyer 28 positioned beneath the husking rolls, and an oscillating ear presser 29 positioned above the rolls. Each transverse conveying means 19 includes a shell 30 and an auger feed 31 positioned therein so as to be supported only at its outer end and to be free and unencumbered at its inner end adjacent the wagon elevator 20.

A pair of fabricated channel members 32 is secured to the rear axle 13 by bolts 33 and extends rearwardly therefrom to a point to the rear of the wheels 14. A transverse pipe 34 is secured to the rear ends of the channel members 32 and extends across the rear of the tractor to points outside the tractor wheels 14. As shown in Figures 2 and 6, a pair of spaced longitudinal members 35 is secured to each end of the transverse tube 34 at points outside a rear wheel 14 and extends forwardly thereof to a point in front of the rear wheel 14. As seen in Figure 7, the longitudinal members 35 are secured, as by welding, at their forward ends to a short tubular section 36 which extends through them. Pieces 37 are secured, as by welding, to the short tubular section 36 within the longitudinal members 35 and extend upwardly from the tubular section 36. Flanged rings 38 are secured, as by welding, to the pieces 37 and form a bearing for a tube 39 which may rotate within the flange members about a horizontal axis. A vertical tubular projection 40 is secured, as by welding, to the tube 39 and fits within a ring 41 secured to the under side of the snapping unit 17. The tube 39 may rotate within the flanged rings 38 so as to provide a horizontal pivot axis for the snapping unit 17, and the ring 41 may rotate with respect to the vertical projection 40 so as to provide the snapping unit 17 with a vertical pivot axis. The purposes of these axes will be described later. The short tubular section 36 is secured to and held in alinement with a tubular support 42 by means of bolts 43 which secure a flange 44 secured, as by welding, to the tubular support 42, to the inner longitudinal member 35 and the vertical piece 37. To the opposite end of the tubular support 42 is secured a bracket 45 which is in turn secured to the tractor body 10 by bolts 46. Thus, there is provided for each half of the corn picker a supporting framework which includes the transverse pipe 34 carried on the fabricated channels 32, the longitudinal members 35, the short tubular sections 36, and the transverse tubular support 42. This supporting framework extends outwardly and around a rear wheel 14 and serves to carry the husking unit 18. This framework also serves as a support for the rear end of each picking unit 17, which is pivoted by the ring 41 on the vertical projection 40 carried in turn on the tube 39 pivoted in the rings 38 secured to the pieces 37, secured in turn to the short tubular section 36. Each picking unit is also supported by means of a bell-crank 47, of which one arm is connected to a mid-point of the picking unit by a link 48. There are provided two bell-cranks 47, one for each picking unit 17, and they are secured to the ends of a rock-shaft 49 carried in brackets 50 secured to the transverse tubular supports 42. It has been stated that one arm of each bell-crank 47 is connected by a link 48 to the mid-point of a picking unit 17. The other arm of each bell-crank is connected by a link 51 to a detent lever 52 fixable in a plurality of positions of a detent mechanism 53 secured to the rear axle 13. By adjustment of the lever 52, a raising and lowering of the snapping units 17 about horizontal axes, determined by the pivoting of the tube 39 in the flanged rings 38, is effected. Springs 54 connected to the tractor body 11 and the bell-cranks 47 serve to counterbalance the weight of the snapping units 17.

The various parts of the picking and husking units are driven as indicated in Figures 4 and 5. A power take-off shaft 55 extends from the rear of the tractor body 11 and upon this shaft is secured a gear 56 engaged by a sprocket chain 57, which also engages a sprocket 58 secured upon a shaft 59. The shaft 59 extends into a gear box 60 and from the shaft 59 through bevel gears within the gear-box 60 is derived drive for transverse shafts 61, extending to opposite sides of the tractor. As shown in Figure 4, the one drive shaft 61 extends to the right and carries at its outer end sprockets 62 and 63. A chain 64 engages the sprocket 63 and also a sprocket 65 secured to the auger feed 31, forming part of the transverse feeding device 19. Thus, this feed device is driven. The sprocket 63 is engaged by a chain 67 which also engages a sprocket 68 secured to a shaft 69, to which is also secured a sprocket 70 engaged by a chain 71. As seen in Figure 5, the chain 71 engages a sprocket 72 which drives the oscillating ear presser 29. The chain 71 also engages an idler gear 73 and a gear 74 secured to a shaft 75. Secured to the shaft 75 is a bevel gear 76 and another bevel gear 77. The bevel gear 76 meshes with a bevel gear 78, which drives the husking rolls 27. The bevel gear 76 also meshes with a bevel gear 79, which drives the snapping rolls 21 through a telescoping shaft 81 and universal joints 82 and 83. The bevel gear 77 meshes with a bevel gear 84 secured upon a shaft 85, to which are also secured sprockets 86 and 87. The ear-forwarder chain 24 meshes with the sprocket 86, and this same chain also engages a sprocket 88 secured upon a shaft 89 to which is also secured a sprocket 90. A sprocket chain 91 engages the sprocket 90 and also a sprocket 92 secured upon a shaft 93, to which is also secured a bevel gear 94 meshing with a bevel gear 95 driving the inner gatherer chain 25. The sprocket 87 is engaged by a chain 96, which also engages a sprocket 97, to which is secured a bevel gear 98 engaging a bevel gear 99 driving the outer gatherer chain 26. A pulley 100 is secured to one transverse shaft 61 adjacent the gear-box 60 and is engaged by a belt 101 which also engages a pulley 102 driving the wagon elevator 20.

Operation of the corn picker is in the usual manner. The tractor with the picker mounted thereon is driven through a field of corn, with adjacent rows of corn passing on opposite sides of the tractor body 11 and into the forward ends of the snapping rolls 21. The stalks of corn are bent somewhat outwardly as they pass upwardly through the snapping rolls. The snapped corn is deposited in the ear elevator 24 and elevated upwardly, eventually reaching a shield 103 and falling therefrom onto the husking rolls 27. The ears while being husked pass along the husking rolls and move from the rear end thereof onto a conveyer 28 and from that are transferred transversely across the rear of the tractor by the auger 31 onto the wagon elevator 20. As has been previously stated, the husking units are positioned outside the wheels 14 so that the corn is snapped from stalks which are inside the wheels 14 and is then transferred to a point outside the wheels and in front of them, and then passes along and outside the wheels to a point to the rear of them. When the corn picker is to be removed from the tractor, the links 48, which connect the bell-cranks 47 to the snapping units, are disconnected from the snapping units, and the snapping units are moved outwardly so that they occupy a position as indicated by the dotted-line position of the right-hand unit, as shown in Figure 2. It will be observed that in this position the snapping unit 17 is entirely outside the tractor wheel 14. Then, supports are placed under the ends of the transverse pipe 34 and also under the short tubular sections 36 extending between the front ends of the longitudinal members 35. Then, the short tubular sections 36 are disconnected from the transverse supports 42 by removal of the bolts 43. The fabricated channel members 32 are disconnected from the rear axle 13 by removal of the bolts 33. Next, the power take-off shaft 55 of the tractor is disconnected from the shaft 59 and the transverse shafts 61 by removal of the sprocket chain 57. Now, the tractor may be driven forwardly and out of the corn picker, since the picker is carried upon supports beneath its framework and the snapping units are entirely outside the tractor wheels 14. Since no part of the corn picker extends across the rear axle but, instead, the parts of the corn picker—that is, the husking units 18— which extend from in front of the rear axle to in rear of the rear axle are positioned outside the wheels 14, no lifting and lowering of parts across the rear axle is required and thus removal of the corn picker from the tractor is simplified. Correspondingly, the attaching of the corn picker to the tractor is made easy. Although the husking units 18 are positioned outside the tractor wheels, corn ears are snapped from adjacent rows inside the wheels and the snapping units are so constructed and arranged that they snap ears from stalks inside the wheels and yet convey the corn to points outside the wheels, so that the corn is passed through husking units outside the wheels.

The intention is to limit the invention only within the scope of the appended claims.

What is claimed is:

1. In combination, a tractor having a body, a rear axle extending from one side of the body, and a wheel on the axle spaced from the body, crop-gathering means positioned in front of the rear axle alongside the tractor body for gathering crops from a plant row between the wheel and the body, means mounting the crop-gathering means on the tractor, crop-treating means positioned so as to extend along the outer side of and below the wheel for treating crops gathered by the crop-gathering means and moving them along the outer side of the wheel to the rear of the rear axle, and means mounting the crop-treating means on the tractor.

2. In combination, a tractor having a body, a rear axle extending from one side of the body, and a wheel on the axle spaced from the body, snapping means positioned to operate at the side of the tractor body and in front of the rear axle, for gathering crops from a plant row between the wheel and the body, means mounting the snapping means on the tractor, husking means positioned outside the tractor wheel for husking crops received from the snapping means and transferring the crops outside the wheel to the rear of the rear axle, and means mounting the husking means on the tractor.

3. In combination, a tractor having a body, a rear axle extending therefrom, and a wheel on the rear axle, a snapping unit extending from a point in front of the rear axle and the wheel and alongside the tractor body to a point outwardly of the wheel so as to be enabled to snap corn ears from a row between the body and the wheel and to move the ears to a point outwardly of the wheel, a husking unit extending longitudinally of the tractor outside the wheel from in front of the rear axle to the rear of the rear axle so as to be enabled to receive ears from the snapping unit outside the wheel and to transfer them outside the wheel to the rear of the rear axle, and means mounting the husking unit on the tractor.

4. In combination, a tractor having a body, a rear axle extending therefrom, and a wheel on the rear axle, a snapping unit extending from a point in front of the rear axle and the wheel and alongside the tractor body to a point outwardly of the wheel so as to be enabled to pick ears from a row between the wheel and the body and to transfer them outside the wheel, means pivotally mounting the snapping unit on the tractor at a point outside the wheel so as to enable the snapping unit to be swung outwardly of the wheel, a husking unit extending along and outside the wheel so as to be enabled to receive ears from the snapping unit and to transfer them along and outside the wheel to the rear of the rear axle, and means mounting the husking unit on the tractor.

5. In combination, a tractor having a body, a rear axle extending therefrom, and a wheel on the axle, a crop-gathering unit extending from a point in front of the rear axle and the wheel and alongside the body to a point outward of the wheel so as to be enabled to gather crops from a row between the wheel and the body and to transfer them outside the wheel, means pivotally mounting the crop-gathering unit on the tractor at a point outside the wheel so as to enable the crop-gathering unit to be swung outwardly of the wheel, means for transferring crops from the crop-gathering unit outside of and along the wheel to the rear of the rear axle, and means mounting the transferring means on the tractor.

6. In combination, a tractor having a body, a rear axle extending therefrom, and a wheel on the rear axle, a first transverse supporting member secured to the tractor and extending in front of and in spaced parallel relation to the rear axle to a point outward of the wheel, a second transverse member secured to the tractor and extending behind the rear axle and in spaced parallel relation thereto to a point outward of the wheel, a husking unit extending along and outside the wheel from in front of the rear axle to the rear thereof, means mounting the husking unit on the transverse members, a snapping unit extending from a point forwardly of the wheel and alongside the body to a point outward of the wheel, and means mounting the snapping unit on the first transverse member at points outward of the wheel and between the wheel and the body.

7. In combination, a tractor having a body, a rear axle extending therefrom, and a wheel on the rear axle, a first transverse supporting member secured to the tractor and extending in front of and in spaced parallel relation to the rear axle to a point outward of the wheel, a second transverse member secured to the tractor and extending behind the rear axle and in spaced parallel relation thereto to a point outward of the wheel, a husking unit extending along and outside the wheel from in front of the rear axle to the rear thereof, means mounting the husking unit on the transverse members, a snapping unit extending from a point forwardly of the wheel and alongside the body to a point outward of the wheel, and means mounting the snapping unit on the first transverse member for pivotal movement on a vertical axis outward of the wheel so as to enable the snapping unit to be swung completely outwardly of the wheel.

8. In combination, a tractor having a body, a rear axle extending therefrom, and a wheel on the rear axle, a first transverse supporting member secured to the tractor and extending in front of and in spaced parallel relation to the rear axle to a point outward of the wheel, a second transverse member secured to the tractor and extending behind the rear axle and in spaced parallel relation thereto to a point outward of the wheel, a husking unit extending along and outside the wheel from in front of the rear axle to the rear thereof, means mounting the husking unit on the transverse members, a snapping unit extending from a point ahead of the wheel and alongside the body to a point outward of the wheel, means mounting the snapping unit on the first transverse member at a point outward of the wheel for pivotal movement on a horizontal axis, and lifting means mounting a point of the snapping unit between the wheel and the body on a point of the first transverse member between the wheel and the body for lifting the snapping unit by pivoting about a horizontal axis at the point of mounting on the first transverse member outward of the wheel.

9. In combination, a tractor having a body, a rear axle extending therefrom, and a wheel on the rear axle, a first transverse supporting member secured to the tractor and extending in front of and in spaced parallel relation to the rear axle to a point outward of the wheel, a second transverse member secured to the tractor and extending behind the rear axle and in spaced parallel relation thereto to a point outward of the wheel, a husking unit extending along and outside the wheel from in front of the rear axle to the rear thereof, means mounting the husking unit on the transverse members, a snapping unit extending from a point ahead of the wheel and alongside the body to a point outward of the wheel, and means mounting the snapping unit on the first transverse member at a point outward of the wheel for pivotal movement about a vertical axis so as to enable the portion of the snapping unit between the wheel and the body to be swung outwardly of the wheel and for pivotal movement about a horizontal axis so as to enable the said portion of the snapping unit to be lifted.

10. In combination, a tractor having a body, a rear axle extending from each side of the body, and a wheel on each axle spaced from the body, a crop-gathering means positioned at each side of the body for gathering crops from adjacent rows alongside the tractor body and between the wheels and the body, means mounting the crop-gathering means on the tractor, crop-treating means positioned so as to extend along the outer sides of the wheels for treating crops gathered by the crop-gathering means and moving them along the outer sides of and below the wheels to the rear of the rear axle, and means mounting the crop-treating means on the tractor.

11. In combination, a tractor having a body, a rear axle extending from each side of the body, and a wheel on each axle spaced from the body, snapping means positioned at each side of the body to operate at the side of the tractor body on adjacent rows between the wheels and the body, means mounting the snapping means on the tractor, husking means positioned outside and below the tractor wheels for husking crops received from the snapping means and transferring the crops outside the wheels to the rear of the rear axle, and means mounting the husking means on the tractor.

12. In combination, a tractor having a body, a rear axle extending at each side therefrom, and a wheel on each rear axle, a snapping unit at each side of the body extending from a point in front of the rear axle and adjacent the tractor body to a point outwardly of the wheel so as to snap corn ears from adjacent rows between the body and the wheels and to move the ears to points outwardly of the wheels, a husking unit extending longitudinally of the tractor outside and below each wheel from in front of the rear axle to the rear of the rear axle so as to be enabled to receive ears from the snapping units outside the wheels and to transfer them outside the wheels to the rear of the rear axle, and means mounting the husking units on the tractor.

13. In combination, a tractor having a body, a rear axle extending therefrom at each side thereof, and a wheel on each rear axle, a first transverse supporting member secured to the tractor and extending in front of and in spaced parallel relation to the rear axle to points outward of the wheels, a second transverse member secured to the tractor and extending behind the rear axle and in spaced parallel relation thereto to a point outward of the wheels, a husking unit extending along and outside each wheel from in front of the rear axle to the rear thereof, means mounting the husking units on the transverse members, snapping units extending from points adjacent the body to points outward of the wheels, and means mounting the snapping units on the first transverse member at points outward and inward of the wheels.

BENJAMIN M. HYMAN.